United States Patent [19]

Anhegger et al.

[11] Patent Number: 4,656,807
[45] Date of Patent: Apr. 14, 1987

[54] DETACHABLE FASTENING OF A DECORATIVE STRIP

[75] Inventors: Sigmund Anhegger, Renningen; Klaus-Peter Lehmann, Muehlacker, both of Fed. Rep. of Germany

[73] Assignee: Ing. H.c.F. Porsche Aktiengesellschaft, Fed. Rep. of Germany

[21] Appl. No.: 811,337

[22] Filed: Dec. 20, 1985

[30] Foreign Application Priority Data

Dec. 22, 1984 [DE] Fed. Rep. of Germany ....... 3447097

[51] Int. Cl.⁴ ............................................. B60R 13/04
[52] U.S. Cl. .................... 52/718.1; 428/31; 428/100; 24/292; 24/293; 24/297
[58] Field of Search ............... 293/1; 428/31, 99, 100; 52/717.1, 718.1; 24/289-297

[56] References Cited

U.S. PATENT DOCUMENTS 3,631,569 1/1972 Heath .................................. 52/718.1
4,147,005 4/1979 Meyer .................................. 52/397

FOREIGN PATENT DOCUMENTS 1600877 10/1981 United Kingdom .

Primary Examiner—Alexander S. Thomas
Attorney, Agent, or Firm—Barnes & Thornburg

[57] ABSTRACT

A decorative strip detachably secured at the support flange of a motor vehicle includes two essentially parallelly extending support sections of which one abuts at the bottom side of the support flange. Detent members are provided at a retaining clamp fastened at a flange bolt which engage form-lockingly and force-lockingly into one of several detent receiving elements of the support sections arranged one behind the other, whereby the apertures are preferably provided at the support section opposite the support flange. A decorative strip is created by this arrangement which with a secure fastening is adjustable relative to the body as well as adapted to be installed and disassembled in a simple manner.

16 Claims, 3 Drawing Figures

DETACHABLE FASTENING OF A DECORATIVE STRIP

The present invention relates to a detachable fastening of a decorative strip at a support flange of a motor vehicle whereby the decorative strip cooperates with a retaining clamp which is held in position by a flange bolt attached at the support flange.

A strip fastening of this type is disclosed in the DE-AS No. 21 22 250. However, it is disadvantageous with this construction that no means are provided for compensating manufacturing tolerances.

A retaining clamp mounted on a support flange is disclosed in the German Pat. No. 30 33 389 on which a decorative strip is adapted to be clipped or snapped on. A spring element and a nose-like projection are provided at the retaining clamp which cooperate by engagement from behind with a support shoulder, respectively, a groove-like recess of the decorative strip.

In order to assure a completely satisfactory functioning with this type of decorative strip fastening, the support flange, the retaining clamp and the decorative strip have to be manufactured relatively accurately in their dimensions which is expensive. Additionally, for the disassembly of the decorative strip, an auxiliary tool has to be inserted between support flange and decorative strip which damages the paint surface of the support flange. Therebeyond, this decorative strip is not adjustable with respect to the body so that a differently large gap between body and decorative strip results over the length dimension of the decorative strip. Such visible inaccuracies lead to a quality impairment.

It is the object of the present invention to so construct a decorative strip that with a secure fastening, it is adjustable relative to the body and can be installed and disassembled in a simple manner.

The underlying problems are solved according to the present invention in that the decorative strip includes two essentially parallelly extending support sections, of which one abuts section-wise at the bottom side of the support flange, and in that at least one detent member is provdied at the retaining clamp which engages form-lockingly and force-lockingly into one of several detent receiving means of the support sections disposed one behind the other, whereby the several detent receiving means are preferably provided at the support section of the decorative strip opposite the support flange.

The principal advantages obtained with the present invention reside in that as a result of the adjustable fastening of the decorative strip, usual tolerances are compensated, i.e., that disturbing form configurations between body and decorative strip are avoided. A secure fastening of the decorative strip is assured by the cooperation of the several detent receiving means of the decorative strip with detent members of the retaining clamps. A simple disassembly of the decorative strip is possible by the offset web of the retaining clamp. The web merely has to be pressed downwardly into a release position by means of an auxiliary tool introduced into the gap between decorative strip and wall section.

A sealing element secured at the decorative strip covers the gap between the decorative strip and a vertical wall section of the roof and thus prevents the entry of water into the interior hollow space of the decorative strip.

These and other objects, features and advantages of the present invention will become more apparent from the following description when taken in connection with the accompanying drawing which shows, for purposes of illustration only, two embodiments in accordance with the present invention, and wherein.

Figure 1:
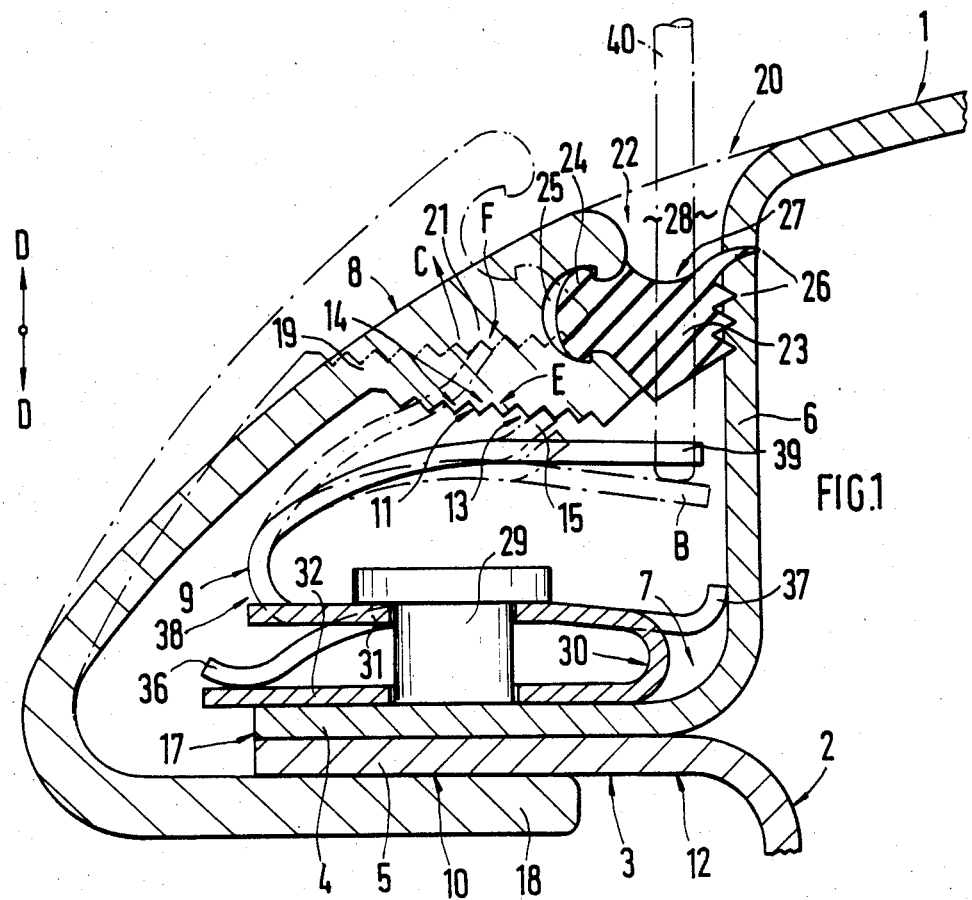
FIG. 1 is a partial cross-sectional view through a roof frame with a decorative strip fastening in accordance with the present invention.

Referring now to the drawing wherein like reference numerals are used throughout the various views to designate like parts, a roof generally designated by reference numeral 1 and a lateral part generally designated by reference numeral 2 are connected with each other at a common support flange generally designated by reference numeral 3 by spot welding. The approximately horizontally arranged support flange 3 is composed of angularly bent walls 4 and 5 of the roof 1 and of the lateral part 2. The wall 4 and a wall section 6 extending approximately vertically with respect thereto form an outwardly disposed step-shaped offset 7 off the roof 1.

For covering the support flange 3, respectively, the step-shaped offset 7, a decorative strip generally designated by reference numeral 8 is provided which is detachably secured at the support flange 3 by means of retaining clamps generally designated by reference numeral 9. The decorative strip 8 which is made of plastic material or of light metal includes two essentially parallelly extending support sections 10 and 11 of which one support section 10 abuts with its inner side section-wise at the bottom side 12 of the support flange 3. According to FIG. 1, at least one detent member generally designated by reference numeral 13 is provided at the retaining clamp 9 which extends above the support flange 3; the detent member 13 engages form-lockingly and force-lockingly in one of several detent receiving means 14 disposed one behind the other of the support section 11 located opposite the support section 10.

Figure 2:
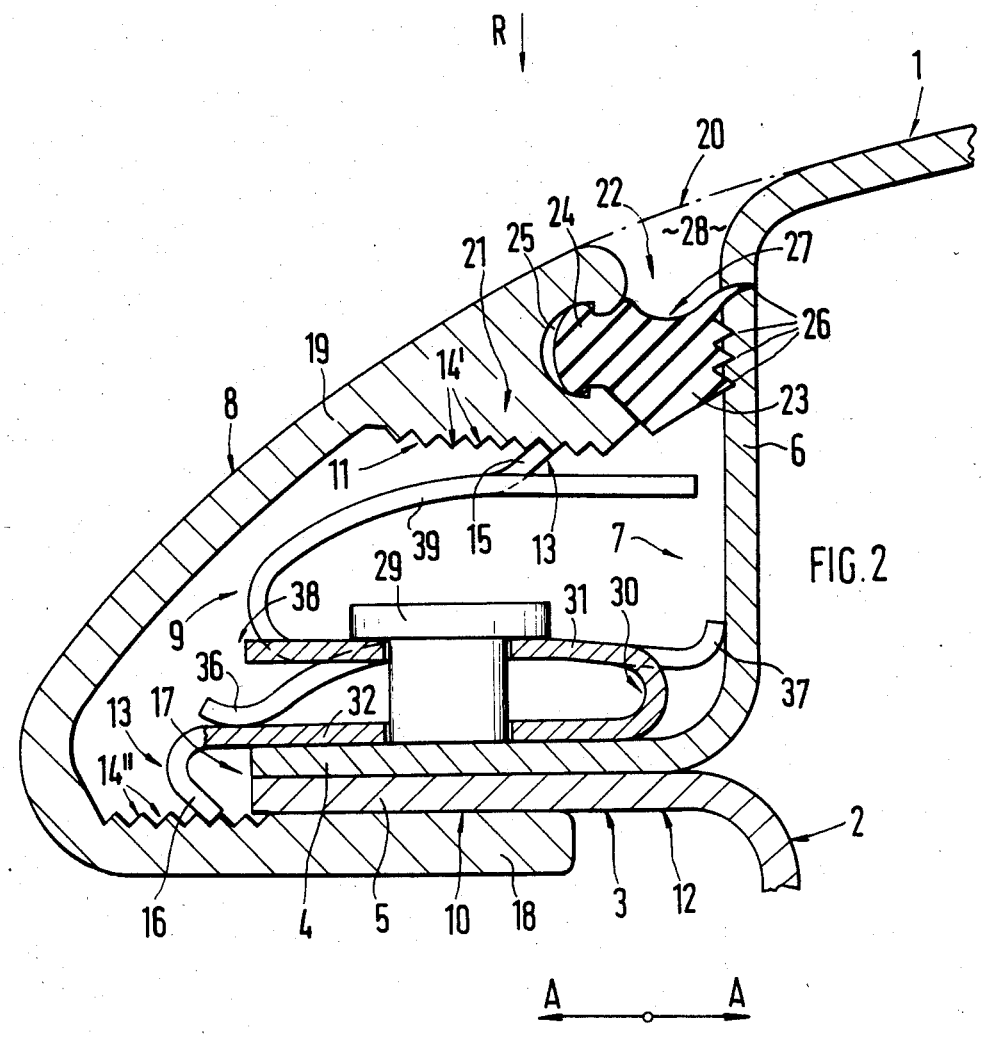
FIG. 2 is a partial cross-sectional view, similar to FIG. 1, of a further embodiment of a decorative strip fastening in accordance with the present invention.

According to FIG. 2, several detent receiving means 14 are provided at both support sections 10 and 11 which cooperate with adjoining detent members 13 of the retaining clamp 9. Preferably, the detent members 13 are formed by offset springy tongues 15 and 16 of the retaining clamp 9 whereby the tongues 15 are directed toward the support section 11, whereas the tongues 16 extend toward the support section 10. The tongues 16 are arranged in front of a free end 17 of the support flange 3.

However, there also exists the possibility to construct the detent members 13 as nose-like projections of cam-like offsets.

The detent receiving means 14 are constructed saw-tooth-like shaped according to FIGS. 1 and 2. For the sake of clarity, the detent receiving means arranged at the upper support section 11 are designated in FIG. 2 by reference numerals 14' whereas the detent receiving means provided at the lower support section 10 carry the reference numerals 14". As viewed in the vehicle transverse direction A—A, the detent receiving means 14' are arranged offset to the detent receiving means 14". However, it would also be feasible to construct the apertures 14 of undulated shape or of groove-shape. As a result of the arrangement of several adjoining apertures 14 disposed adjacent one another, the decorative strip 8 is adjustable in the vehicle transverse direction A—A whereby usual manufacturing and assembly tolerances can be compensated.

The support section 10 forms a leg 18 of the decorative strip 8 which is approximately V-shaped in cross section whereas the other leg 19 is matched to the configuration of the roof contour 20. The support section 11 represents the lower boundary of an approximately triangularly shaped cross-sectional enlargement 21 of the leg 19. An upper end section of the leg 19 extends toward the adjoining wall section 6 under formation of a gap 22. For covering off the gap 22, a sealing element 23 made of elastic material is provided which engages with a retaining section 24 into a groove 25 of the decorative strip 8 provided with an undercut. The groove 25 is provided within the area of the cross-sectional enlargement 21 and is constructed open in the direction toward the wall section 6.

Furthermore, the sealing element 23 includes lips 26 which are supported with prestress at the wall section 6. An upper boundary 27 of the sealing element 23 extends at a distance to the roof contour 20 so that a drain channel 28 is formed thereby.

The retaining clamps made of spring steel are secured at the support flange 3 by means of flange bolts 29. Each flange bolt 29 is arranged above the wall 4 and is installed approximately perpendicularly thereto. The retaining clamp 9 includes, according to FIGS. 1 and 2, an approximately U-shaped base body 30 whose legs 31 and 32 are fixed between flange bolt 29 and wall 4.

Longitudinal slots 33 (FIG. 3) are provided in the legs 31 and 32 for the insertion of the retaining clamp 9, whereby at the end of the longitudinal slot 33, an insertion section 34 for the flange bolt 29 is provided which has a larger cross section. The retaining clamp which is mounted from above on the flange bolt 29 is subsequently displaced along the obliquely extending longitudinal slot 33 until the flange bolt 29 abuts at the other end 35 of the longitudinal slot 33. In this position, the retaining clamp 9 is fixed at the support flange 3.

According to FIG. 2, the lower leg 32 terminates adjacent the free end 17 of the support flange 3. According to FIG. 3, the locally projecting tongues 16 are provided at the leg 32. In order that the two legs 31 and 32 remain at a parallel distance to one another, a support web 36 extends away from the leg 31 which abuts at the leg 32 with a rounded-off portion. Furthermore, the retaining clamp 9 includes abutment members 37 (FIGS. 1, 2 and 3) which are supported at the wall section 6.

A web 39 which is offset upwardly from the free end 38 of the leg 31, extends approximately up to the wall section 6, whereby the web 39 and the leg 31 adjoin each other U-shaped. The obliquely upwardly projecting springy tongues 15 are provided in a center area of the web 39.

For the disassembly of the decorative strip 8, the web 39 is pressed downwardly into a release position B by means of an auxiliary tool 40 inserted through the gap 22, as a result of which the tongues 15 are disengaged from the apertures 14.

The tongues 15 are prestressed in the direction C in such a manner that tolerances can be absorbed in the vertical direction D-D. A decorative strip 8 can be secured by means of the illustrated retaining clamps 9 whose support section 11 assumes either a position E or a position F indicated in dash lines.

Figure 3:
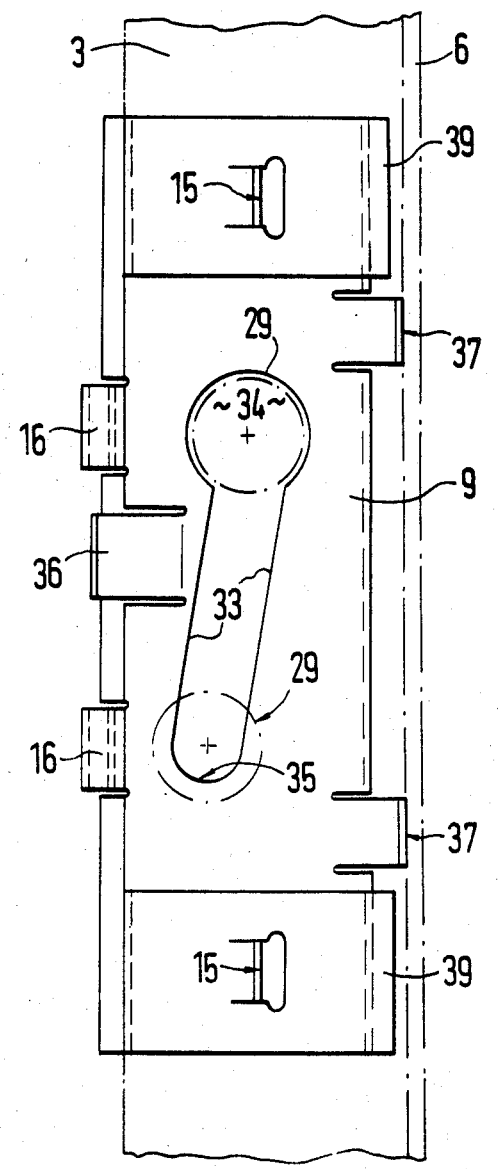
FIG. 3 is a plan view taken in the direction of arrow R of FIG. 2, whereby only the retaining clamp, the support flange, and the flange bolt are illustrated.

According to FIG. 3, the retaining clamp includes two tongues 15 and 16, two abutment members 37 and a support section 36.

While we have shown and described only two embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A detachable fastening of a decorative strip at a support flange means of a motor vehicle, comprising decorative strip means cooperating with a retaining clamp means, flange bolt means mounted at the support flange means for holding in position the retaining clamp means, the decorative strip means including two essentially parallelly extending support sections of which one of the support sections abuts section-wise at the bottom side of the support flange means, said retaining clamp means including at least one detent member which form-lockingly and force-lockingly engages into one of several detent receiving means arranged one behind the other on the other of the support sections.

2. A detachable fastening according to claim 1, wherein the several detent receiving means are provided at least at the support section of the decorative strip means opposite the support flange means.

3. A detachable fastening according to claim 2, wherein the detent receiving means on the other of the support section forms a lower boundary of an approximately triangularly shaped cross-sectional enlargement of the decorative strip means.

4. A detachable fastening according to claim 1, wherein the several detent receiving means comprise two sets of detent receiving means with one set provided at each support section and cooperating each with an adjoining detent member of the retaining clamp means.

5. A detachable fastening according to claim 4, wherein the two sets of the several detent receiving means are provided one set above and one set below the retaining clamp means, the upper several detent receiving means being arranged offset to the lower several detent receiving means as viewed in the vehicle transverse direction.

6. A detachable fastening according to claim 5, wherein the retaining clamp means includes a web directed toward a wall section of the vehicle body, said web being accessible for the disassembly of the decorative strip means by means of an auxiliary tool adapted to be inserted into a gap between the decorative strip means and the wall section to cause the retaining clamp means to disengage the detent means from the several detent receiving means.

7. A detachable fastening according to claim 6, further comprising sealing means for covering the gap, said sealing means being secured at the decorative strip means.

8. A detachable fastening according to claim 7, wherein the detent receiving means of the other of the support forms a lower boundary of an approximately triangularly shaped cross-sectional enlargement of the decorative strip means.

9. A detachable fastening according to claim 8, wherein the several detent receiving means are constructed saw-tooth shaped.

10. A detachable fastening according to claim 8, wherein the detent members are formed by offset springy tongues of the retaining clamp means.

11. A detachable fastening according to claim 1, wherein the detent members are formed by offset springy tongues of the retaining clamp means.

12. A detachable fastening according to claim 11, wherein the several detent receiving means are constructed saw-tooth shaped.

13. A detachable fastening according to claim 1, wherein there are two sets of the several detent receiving means are provided, with one set above and one set below the retaining clamp means, the upper several detent receiving means being arranged offset to the lower several detent receiving means as viewed in the vehicle transverse direction.

14. A detachable fastening according to claim 1, wherein the retaining clamp means includes a web directed toward a wall section of the vehicle body, said web being accessible for the disassembly of the decorative strip means by means of an auxiliary tool adapted to be inserted into a gap between the decorative strip means and the wall section to cause the restraining clamp means to disengage the detent means from the several detent receiving means.

15. A detachable fastening according to claim 14, further comprising sealing means for covering the gap, said sealing means being secured at the decorative strip means.

16. A detachable fastening according to claim 15, wherein there are two sets of the several detent receiving means, one set provided above and one set provided below the retaining clamp means, the upper several detent receiving means being arranged offset to the lower several detent receiving means as viewed in the vehicle transverse direction.

* * * * *